Figure 1:
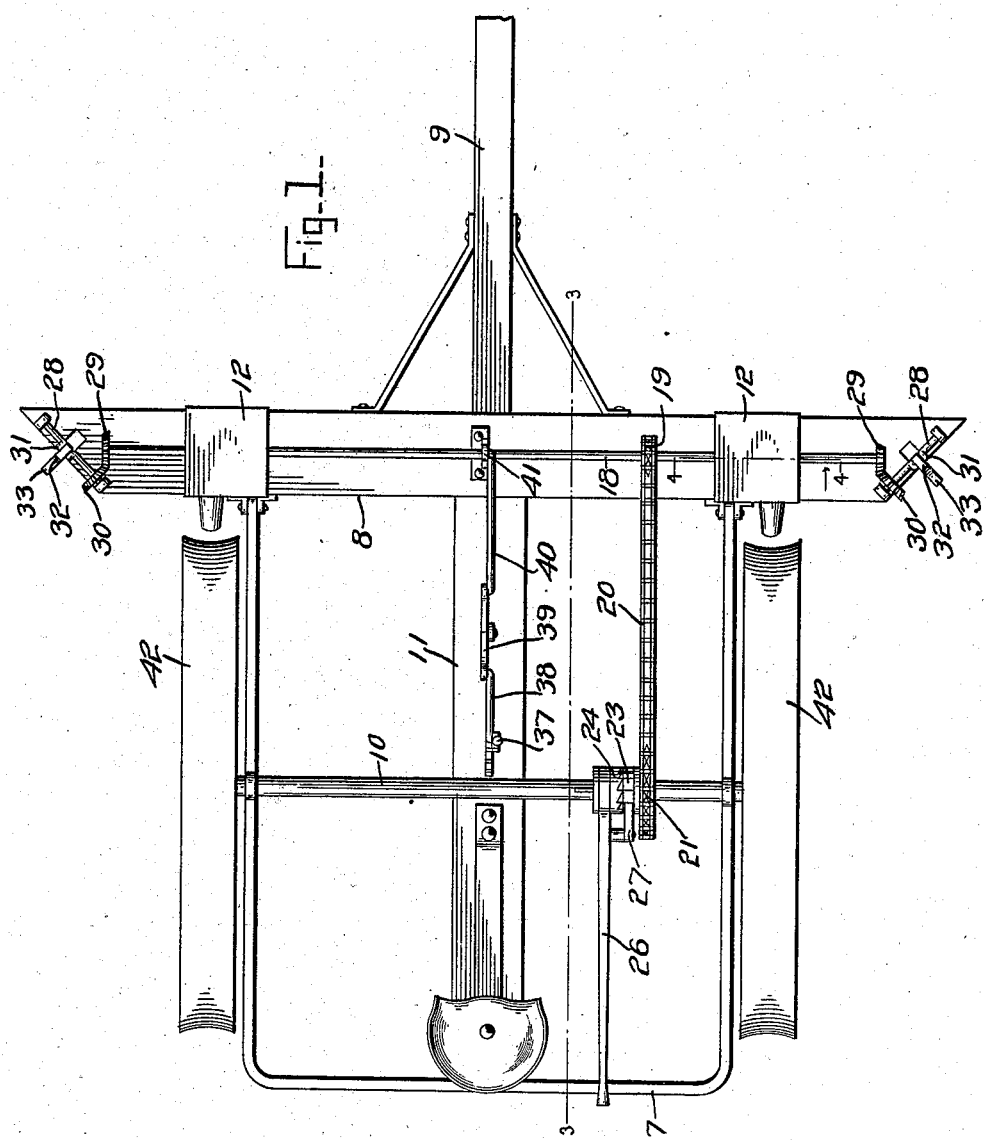

P. C. FOX.
CHECK ROW CORN PLANTER.
APPLICATION FILED NOV. 4, 1907.

900,361.

Patented Oct. 6, 1908.
2 SHEETS—SHEET 1.

Witnesses
Inventor
P. C. Fox.
Attorneys.

P. C. FOX.
CHECK ROW CORN PLANTER.
APPLICATION FILED NOV. 4, 1907.
900,361.
Patented Oct. 6, 1908.
2 SHEETS—SHEET 2.
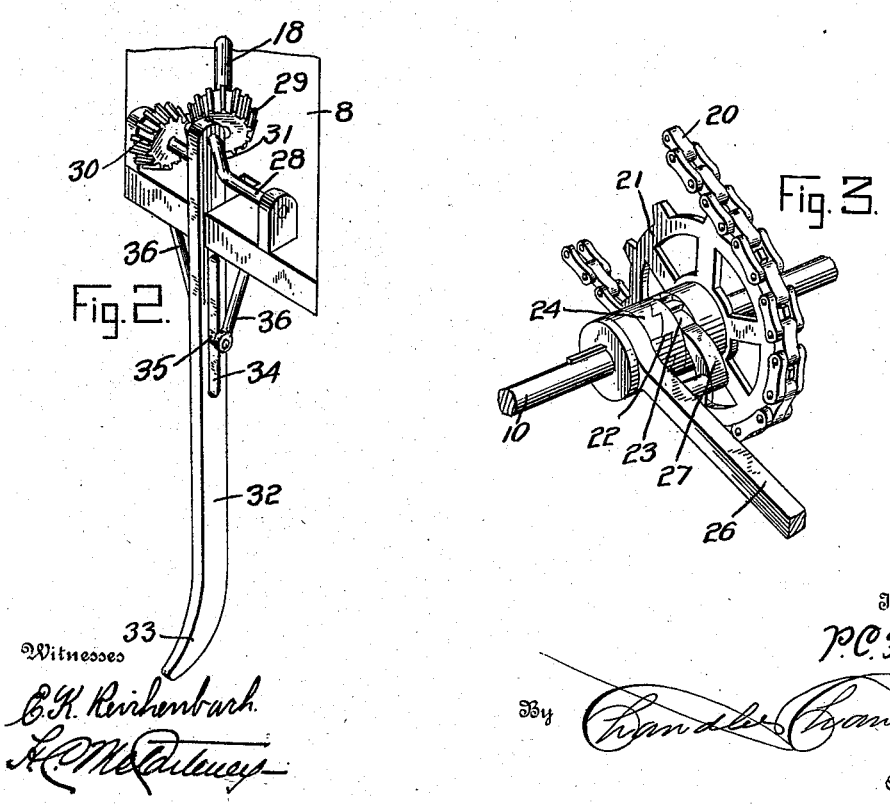

UNITED STATES PATENT OFFICE.

PORTER C. FOX, OF McCOMB, OKLAHOMA.

CHECK-ROW CORN-PLANTER.

No. 900,361.  Specification of Letters Patent.  Patented Oct. 6, 1908.

Application filed November 4, 1907. Serial No. 400,685.

*To all whom it may concern:*

Be it known that I, PORTER C. Fox, a citizen of the United States, residing at McComb, in the county of Pottawatomie, State of Oklahoma, have invented certain new and useful Improvements in Check-Row Corn-Planters; and I do hereby declare the following to be a full, clear, and exact description of the invention, such as will enable others skilled in the art to which it appertains to make and use the same.

The present invention has reference to check-row corn planters, and it aims, generally, to provide an exceedingly simple, as well as highly efficient machine of that type including dropping mechanism and marking mechanism connected together for synchronous action.

More especially, however, the invention resides in the particular means employed for operating the above-mentioned mechanisms, and in the specific construction of the marking mechanism, which latter includes a longitudinally-slotted rod mounted in such a manner as to be capable of both an endwise and a swinging movement so timed that the pointed lower end of the rod enters the ground simultaneously with the discharge of the seed from the dropper mechanism, thus forming a series of shallow cavities, or furrows which aline exactly with the points in the main furrows where the seed falls and thus form guides for the deposit of seeds in the succeeding furrows.

The invention further resides in the provision of means for effecting a vertical adjustment of that portion of the frame, which carries the above-mentioned mechanisms, and of means for throwing said mechanisms into and out of operation.

The invention will be readily understood from a consideration of the following detailed description, and its preferred embodiment is illustrated in the accompanying drawings in which like parts or features, as the case may be, are designated by corresponding reference numerals in the several views.

Of the said drawings:—Figure 1 is a top plan view thereof. Fig. 2 is an enlarged perspective view of the marker and its operating mechanism. Fig. 3 is an enlarged perspective view of the main drive sprocket and the clutch lever with which it is engaged.

Referring more particularly to the drawings, 7 designates, generally, the U-shaped metal frame of the machine the free ends of whose arms are pivoted between pairs of ears secured to the rear face of the front sill 8 to which the tongue 9 is fastened. The frame rests centrally upon the axle 10 and carries a longitudinally-disposed beam 11 which alines with the tongue.

The sill above referred to carries both the dropper and the marking mechanism, the former of which is generally designated by the numerals 12, 12, the hoppers to which said numerals specifically refer being mounted upon the sill 8 towards the opposite ends thereof, the devices within the hoppers being operatively connected with a shaft 18 disposed longitudinally of said sill and journaled in brackets fastened thereto. To effect its rotation, the shaft 18 is provided with a sprocket 19 connected by a chain 20 with a larger sprocket 21 loosely mounted upon the axle 10 and having its hub portion formed with a clutch face 22 and with a circumscribing series of ratchet teeth 23, the clutch face being adapted for engagement with that of a sleeve 24 keyed upon the axle and provided with a circumscribing groove in which the yoke portion of a lever 26 fits comparatively loosely, it being thus possible to throw said shaft into and out of operation according as the sleeve is moved in one direction or the other by the lever. Said lever, moreover, carries a laterally-projecting pawl 27 adapted for engagement with the ratchet teeth 23, so as to permit a rotation of the sprocket 21 at a greater rate of speed than that of the axle, or, in other words, independently thereof, such rotation being effected merely by a swinging movement of the lever after its pawl has been engaged with the ratchet teeth, the loose fit of the lever yoke in the sleeve groove rendering such movement possible.

The marking mechanism, which, as above stated, is likewise carried by the sill 8, comprises a pair of shafts 28 mounted upon the opposite ends of the latter and disposed diagonally with respect thereto, said shafts being driven from the shaft 18 by intermeshing beveled gears 29 and 30 the former of which are secured to the ends of the last-mentioned shaft. Each shaft 28 is formed with a crank portion 31 to which is pivotally connected at its upper end a blade 32 whose lower end is out turned, as indicated by the numeral 33. Each blade is further provided intermediate its ends with a longitudinal slot 34 through which extends a horizontal pin 35 carried by a pair of depending straps 36 secured to the sill.

By reason of this construction, it will be apparent that upon the rotation of the crankshafts, the blades will be given both a vertical and a swinging movement, the latter being effected by the pin and slot above referred to. The pointed lower ends of the blades will therefore dig small cavities or furrows in the ground, the several gears carried by the crank-shafts and the shaft 18 being so proportioned that the formation of a cavity is simultaneous with a discharge from the hopper, and such cavity or furrow, moreover, is disposed exactly in alinement with that in the preceding row which has been filled by the seed discharged, and extends parallel with the same.

In order to regulate the depth to which the blade ends penetrate into the ground, means is provided for bodily raising or lowering the sill 8, and to this end the beam 11 has pivoted thereto forwardly of the axle a lever 37 pivotally connected by a link 38 with one arm of an angle-lever 39 whose opposite arm is similarly connected by a link 40 with a projecting shoulder 41 formed by a block secured centrally to the sill. Movement of the lever in one direction will therefore raise the sill from the ground, and in the other direction will lower the sill, the lever being retained in adjusted position by a dog and rack mechanism of any preferred type.

The operation of the machine is thought to be apparent from the foregoing, and further description thereof is deemed unnecessary beyond the statement that the marks of each series aline exactly with the deposits of seed, and that when one row has been planted, and the machine is turned to plant the succeeding row, the pointed end of one of the blades will descend into the previously formed marks, thus effecting the deposit of seed at points exactly in line with those in the preceding row. When, however, the blade end, in its descent, fails to strike the previously formed marks, the sprocket 21 is rotated by the pawl-carrying lever 26 until the blade end reaches the desired point, whereupon the progress of the machine is continued. The rotation of the axle is effected by means of the traction wheels 42 which are carried thereby, the periphery of said wheels being slightly concaved, as shown.

What is claimed is:—

1. In a machine of the class described, in combination, a frame; a transverse shaft mounted upon one of the end members of the frame; means for driving said shaft; a diagonally-disposed shaft mounted upon one end of said frame member and provided with a crank portion; an endwise movable vertical blade pivoted at its upper end to said crank portion and provided with a longitudinal slot; a driving connection between said transverse shaft and said diagonal shaft, for effecting the movement of said blade; and a pin carried by said frame member and extending through the slot in said blade, for effecting a swinging movement of the latter during its vertical movements.

2. In a machine of the class described, in combination, a frame; a transverse shaft mounted upon one of the end members of the frame; a diagonally-disposed shaft mounted upon one end of said frame member and provided with a crank portion; a vertically-movable blade pivoted at its upper end to said crank portion and provided with a longitudinal slot; a sprocket carried by said transverse shaft; an axle; a sprocket carried by said axle; a sprocket chain connecting said sprockets; a driving connection between said transverse shaft and said diagonal shaft, for effecting the movement of said blade; a pin carried by said frame member and extending through the slot in said blade, for effecting a swinging movement of the latter during its vertical movements; and means for rotating the last-mentioned sprocket independently of the rotation of the axle.

3. In a machine of the class described, in combination, a frame; a transverse shaft mounted upon one of the end members of the frame; means for driving said shaft; a diagonally-disposed shaft mounted upon one end of said frame member and provided with a crank portion; an endwise movable vertical blade pivoted to said crank portion and provided with a longitudinal slot; a driving connection between said transverse shaft and said diagonal shaft, for effecting the movement of said blade; a pair of depending straps secured to said frame member; and a horizontal pin carried by said straps and extending through the slot in said blade, for effecting a swinging movement of the latter during its vertical movements.

4. In a machine of the class described, in combination, a frame; a transverse shaft mounted upon one of the end members of the frame; a diagonally-disposed shaft mounted upon one end of said frame member, and provided with a crank portion; an endwise movable vertical blade pivoted at its upper end to said crank portion, and provided with a longitudinal slot; a driving connection between said transverse and diagonal shafts, for effecting the vertical movement of said blade; a sprocket carried by said transverse shaft; an axle; a sprocket loosely mounted on said axle and provided with a hub having a clutch face and a peripheral series of ratchets; a sprocket chain connecting said sprockets; a clutch member keyed upon said shaft and provided with a circumscribing groove; a lever carried by said member for moving the same into and out of engagement with the last mentioned sprocket, said lever being provided with a yoke portion fitted in said groove; a pin carried by said frame member and extending through the slot in said blade, for effecting a swinging movement of the latter during its vertical movement; and a pawl carried by said lever and adapted for engagement with said ratchet, to rotate the last-mentioned sprocket independently of the rotation of the axle.

In testimony whereof, I affix my signature, in presence of two witnesses.

PORTER C. FOX.

Witnesses:
MABEL KING,
WM. WESSELHOFT.